3,508,164

Filed Sept. 8, 1965

Inventor
T. UCHIDA
By *Walter J. Baum*
Attorney 3,508,164
INTERNAL-MODULATION TYPE OPTICAL MASER DEVICE WITH A BIREFRINGENCE PRISM
Teiji Uchida, Tokyo, Japan, assignor to Nippon Electric Company, Limited, Tokyo, Japan, a corporation of Japan
Filed Sept. 8, 1965, Ser. No. 485,684
Claims priority, application Japan, Sept. 8, 1964, 39/51,276
Int. Cl. H01s 3/11
U.S. Cl. 331—94.5                                        5 Claims

ABSTRACT OF THE DISCLOSURE

An internal modulation type optical maser device includes a laser light source, a pair of reflectors, and a crystal modulating member between one of the reflectors and the source. The crystal modulating member is provided with two end surfaces perpendicular to an optical axis. A birefringent prism of triangular cross section is positioned in the reciprocating light path between the source and the crystal contiguous the modulating member and is formed of a material whose refractive index for extraordinary rays is approximately equal to the refractive index of the crystal for ordinary rays.

---

This invention relates to an internal-modulation type optical maser device and more particularly to an optical maser device of the type having a birefringent prism.

I disclosed in my copending patent application Ser. No. 460,712, filed June 2, 1965, assigned to the same assignee and entitled "Optical Maser Device" (Uchida 5/7), an internal-modulation type optical maser device in which a unique modulator member, such as a KDP crystal piece was interposed between a pair of mirrors of the optical resonator. Although the device disclosed in my above-mentioned copending application has remarkably augmented modulation sensitivity, it nonetheless did not extract the modulated light with the desired efficiency. Said copending application proposed to extract the modulated light through one of the mirrors that has a reflecting power of about 98% or by reflection of the modulated light component to one side at any of the Brewster windows of the gas discharge tube (which serves as the light source) or any of the surfaces of the prisms contained in the modulator member.

As is well known, an optical maser device, particularly a gas optical maser device, has a large time constant as an oscillator. This large time constant prevents variation of the generated light from following the variations of the modulating voltage supplied to the modulator member for internal modulation when the frequency of the modulating voltage is high. Experimental results indicate that the upper frequency limit of the modulating voltage was at most one megacycle and ten megacycles when the light source was a gas optical maser and a solid optical maser, respectively. These results were obtained when using the conventional output extraction means, which it should be noted prevents realization of wide-band communication when using a gas optical maser device. Although considerable wide-band communication is possible when use is made of a solid optical maser as the light source, it should be noted that in the present stage of development, the light generated by a solid optical maser is not considered to be sufficiently coherent to be used as the carrier wave for wide-band communication.

Additionally, it should be remembered that extraction of the modulated light in the prior art utilizes the fact that although the generated light component is not reflected at the Brewster windows of the gas discharge tube and the prism surface of the modulator member (since they fulfill the Brewster reflection-less condition) the modulated light component polarized in the direction perpendicular to the direction of polarization of the generated light component will be reflected at such surfaces. As theoretically predicted, the reflected light will only be a small portion (about 15% when the light is reflected at a glass prism surface having a refractive index of 1.5) of the modulated light component produced by the modulator member. Consequently, in the prior art, the effective modulated light component that was extracted as the output is not too strong.

One proposal to overcome the above-mentioned defect of conventional optical maser devices was made in Proceedings of the Symposium on Optical Masers, Polytechnic Press of the Polytechnic Institute of Brooklyn, 1963, pp. 243–253; particularly, FIGURE 3 on p. 246 and FIG. 4 on p. 247. In these figures the generated light component and the modulated light component are separated from each other by a birefringence prism, such as a Rochon's prism, interposed in the light path in an optical maser device. A Rochon's prism, however, is not practical because it creates large insertion attenuation due to reflections at the input and the output light surfaces. As a result, the insertion of such a prism will further weaken the oscillation output of a gas optical maser whose gain, as is well known, is poor.

An object of the present invention is to provide an improved internal modulation type optical maser which can be used in wide band communication systems.

Another object of this invention is to provide an internal modulation type optical maser with improved extraction means for extracting the modulated light component.

A further object of this invention is to provide an optical maser device of the internal-modulation type, which can not only be modulated with a sufficiently high-frequency modulating signal but which can also produce a strong modulated component.

In principle, the internal-modulation type optical maser device of this invention includes (in addition to the optical maser device described in my above-mentioned copending application comprising a gas discharge tube, a pair of mirrors forming an optical resonator, and a modulator member interposed between the gas discharge tube and one of the mirrors) a specific birefringence prism (to be described in detail hereinafter) disposed in the light path.

With this invention it is possible to more effectively extract the modulated light component which is separated from the generated light component in the light path of an optical maser device. Consequently it is not only possible to make the derived modulated light component sufficiently strong (without diminishing the strength of the generated light component) but also to make the variation of the instantaneous intensity of the generated light follow the high modulating-signal frequency with no adverse effect on the time constant of the optical maser device as a whole.

The above-mentioned and other features and objects of this invention and the means for attaining them will become more apparent and the invention itself will be understood by reference to the following description of embodiments of the invention taken in conjunction with the accompanying drawings in which.

Figure 1:
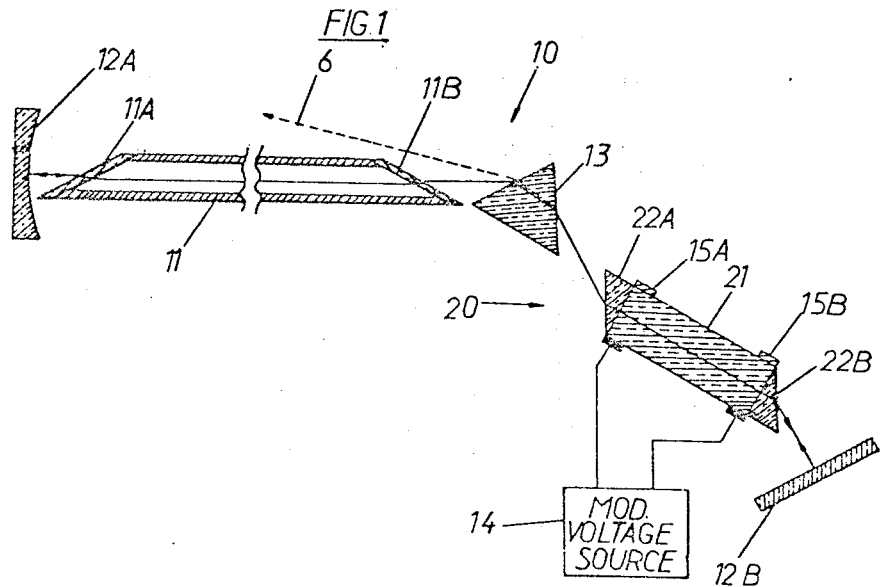
FIG. 1 is an axial sectional view of an arrangement showing the principal of this invention.

Referring to FIG. 1, the internal-modulation type optical maser device 10 of this invention includes a gas discharge tube 11 which when operating provides optical maser action. Tube 11 is provided with Brewster windows 11A and 11B. The normals to these windows each form the Brewster's angle with the tube axis. The pair of mirrors 12A and 12B are positioned to form an optical resonator. A birefringence prism 13 and a modulator member 20 are interposed between the discharge tube 11 and one of the mirrors 12B. The modulator member 20 is composed of a rectangular parallelepiped crystal piece 21 cut (with the longer edges thereof in the direction of the optical axis) from a uniaxial crystal, such as a KDP-crystal, which shows very little absorption for the optical maser light and has a large electro-optical effect (i.e. the effect of transforming by utilizing an electric field produced in the direction of the optical axis, linearly polarized light traveling along the optical axis thereof into similarly traveling elliptically polarized light). A pair of prisms 22A and 22B are attached to the end surfaces of the crystal piece 21. These prisms are disposed perpendicular to the optical axis of the crystal. The electrodes 15A and 15B are attached to the crystal piece 21 adjacent to the respective end surfaces thereof to supply a modulating voltage from a modulating voltage source 14 across the crystal piece to produce an axial electric field. Each of the prisms 22A and 22B is made of glass whose refractive index is equal to the ordinary refractive index $n_0$ (about 1.5) of the crystal piece 21. A first and a second side surface of said prisms form the complementary angle (about 34°) of the Brewster's angle for glass. Each prism, using optical adhesive, is attached at the first side surface thereof to each of the end surfaces of the crystal piece 21 so that: the edge of intersection of the first and the second side surfaces will be parallel to the X or the Y axis of the crystal piece 21; and the second side surfaces of both said prisms will lie parallel to each other. The birefringence prism 13 is made of calcite. One prism edge of member 13 is parallel to the optical axis thereof and the other two side surfaces thereof form an angle (about 62°) which is about twice the complementary angle (i.e. about 31°) of the Brewster's angle (about 59°) for the refractive index (about 1.658) of the ordinary rays of calcite. The modulator member 20 and the birefringence prism 13 are disposed so that the edges of the prisms 22A and 22B and the edge of the birefringence prism are not only perpendicular to the direction of oscillation of the electric field of the generated light but also that the side surfaces onto which the generated light falls will satisfy the Brewster reflection-less condition for the generated light.

The output light of the discharge tube is linearly polarized by the two Brewster windows 11A and 11B with an electric field lying parallel to the plane of incidence or the plane of the drawing. Accordingly, the output light will not be reflected at the input and the output surfaces of the birefringence prism 13 and the modulator member 20 as long as no modulating voltage is supplied from the modulating voltage source 14 to the electrodes 15A and 15B of the crystal piece 21. As a result, the optical maser device 10 can produce sufficiently strong generated light. In other words, the birefringence prism 13 serves as an ordinary prism to deflect the generated light without any reflection at the input and the output surfaces.

When the modulating voltage is supplied between the electrodes 15A and 15B an electric field will be produced within the crystal piece 21 in the direction of the optical axis (Z axis). As described in my copending application (mentioned hereinabove) in the discussion therein of an article in the Proceedings of the I.R.E., vol. 50, No. 4 (April 1962), pp. 452–456, the thus generated electric field will create an induced optical X' and Y' axes in the crystal which will be produced in directions shifted in angle from the crystallographic X and Y axes by —45°, respectively. The inequality of the refractive indices for the linearly polarized light beams whose respective electric fields lie in the X' and the Y' directions produces, from the linearly polarized input light, a modulated light component (or linearly polarized light) that has an electric field in the direction perpendicular to the plane of the electric field (which is perpendicular to the plane of polarization of the input linearly polarized light). The modulated light component travels back through the same light path as the generated light and reaches that side surface of the birefringence prism 13 which is adjacent to the modulator member 20. The modulated light component is then refracted as the extraordinary rays in the birefringence prism 13 to travel to the opposite side surface of the birefringence prism 13 through a different light path (indicated by dashed lines) than that of the generated light because the plane of the electric field of the modulated light is perpendicular to that of the generated light (i.e. perpendicular to the plane of the drawing) and is parallel to the optical axis of calcite. Inasmuch as the generated light component and the modulated light component form an angle of about 17° for visible light, it is feasible to extract only the modulated light component through the light path illustrated in the drawing by a dashed line 6 at that side surface of the birefringence prism 13 which is adjacent to the discharge tube 11.

As will now be clear, the birefringence prism 13 disposed in the optical maser device 10 of this invention, (1) for the generated light component serves merely as a prism with the resulting retention of strong oscillations and (2) for the modulated light component modulated in compliance with the modulating voltage prism 13 serves as a discriminator for selectively extracting only the modulated component.

The above-described embodiment of this invention (FIG. 1) has many discontinuous surfaces through which the light must travel. Consequently, a little loss of light due to scattering and reflection will occur at said discontinuities. This loss can be decreased by some modifications, one of which is illustrated in FIG. 2.

Figure 2:
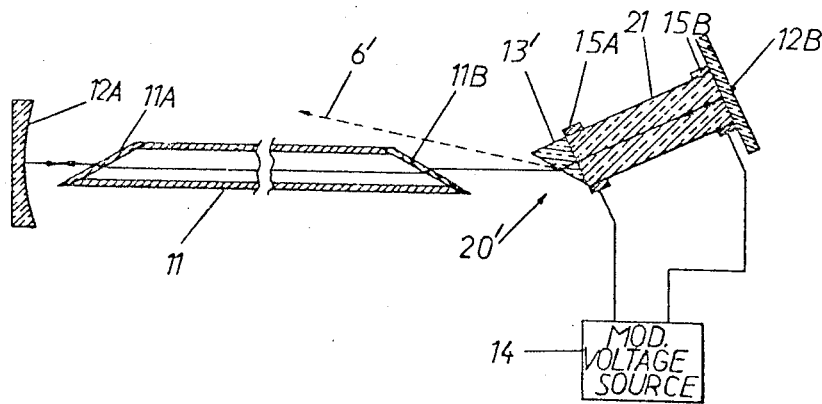
FIG. 2 is an axial sectional view of an embodiment of this invention.

Referring to FIG. 2, a composite modulator member 20' is provided in which the prisms 22A and 22B of the member 20 of FIG. 1 are removed. Prisms 22A and 22B are replaced in FIG. 2 by a birefringence prism 13' attached directly to the crystal piece 21 so as to be in face to face relation with one of the Brewster windows 11B of the discharge tube 11. Moreover, the mirror 12B is attached directly to the opposite end of the crystal piece 21. In this modification, the birefringence prism 13' is made of calcite. A first side surface of prism 13' is parallel to the optical axis thereof. The first surface and a second side surface form (at the prism edge perpendicular to the optical axis) the complementary angle (about 34°) of the Brewster's angle for the refractive index (about 1.49) of calcite for the extraordinary rays. Prism 13' is attached at the first side surface, with optical adhesive, to one of the end surfaces of the crystal piece 21 in such a manner that the prism edge will be parallel to the X or the Y axis of the crystal piece 21. If the crystal piece 21 was cut out of a KDP crystal, approximate equality of the refractive index (about 1.51) thereof for the ordinary rays and that (about 1.49) for extraordinary rays of calcite forming the birefringence prism 13' renders negligible the loss caused by reflection at the surfaces of attachment between the birefringence prism 13′ and the crystal piece 21. The composite modulator member 20′ is disposed in such a manner that the light from the discharge tube 11 will fall onto the second side surface of prism 13′ so as to satisfy the Brewster reflection-less condition. That is, the angle of incidence of the output light from the discharge tube 11 will be equal to the Brewster's angle (about 56°) for the refractive index (about 1.49) for the extraordinary rays in the birefringence prism 13′.

As was the case with the optical maser device 10 of FIG. 1, the generated light is linearly polarized, with the direction of oscillation of the electric field lying in the plane of the drawing, until an electric field is produced by the modulating voltage in the direction of the optical axis of the crystal piece 21. When this axial electric field is produced, a modulated light component will be produced whose plane of polarization will be parallel to the optical axis of the birefringence prism 13′. This modulating component will leave the birefringence prism 13′ along a light path 6′ other than the path of the generated light component (after being refracted at the second side surface with the refractive index for the ordinary rays). With the embodiment of FIG. 2, it is possible to deflect the modulated light component from the generated light component by about 11° and thus the modulated component can be readily extracted.

In the foregoing explanation of the embodiments of this invention, it was assumed that the output light of the discharge tube 11 is linearly polarized. It is, however, possible to obtain an internal-modulation type optical maser device even with the combination of the modulator member 20 or the composite modulator member 20′ and a solid optical maser or other device whose output light is not linearly polarized. This is so because the modulator member 20 or 20′ has Brewster surfaces at the second side surfaces of the prisms 22A and 22B or 13′, which can change non-polarized rays into linearly polarized rays. The plane mirror 12B illustrated in the embodiment of FIG. 1 may be a concave mirror. Moreover, mirror 12B shown in the modification of FIG. 2 attached directly to the crystal piece 21 may be spaced from crystal 21 and instead a prism can be attached to crystal 21 between the crystal and mirror 12B in order to satisfy the Brewster non-reflection condition. Also, in FIG. 1 prism 22B can be omitted and mirror 12B can be attached directly to crystal 21. Furthermore, mirror 12B′ can be replaced with a reflective layer formed directly on the end surface of the crystal piece 21. The crystal piece 21 need not be cut out from a KDP crystal. As clearly indicated in my above-mentioned copending application, crystal 21 can be cut from a crystal of potassium dideuterium phosphate $KD_2PO_4$, potassium dihydrogen arsenate $KH_2AsO_4$, potassium dideuterium arsenate $KD_2AsO_4$, ammonium dihydrogen phosphate $NH_4H_2PO_4$, ammonium dihydrogen arsenate $NH_4H_2AsO_4$, rubidium dihydrogen phosphate $RbH_2PO_4$, or any other crystal of the tetragonal system or from copper (I) chloride, zinc sulfide, or any other crystal of the cubic system which exhibits a large electro-optical effect.

Needless to say, the birefringence prism 13 or 13′ may be made of many materials other than calcite.

In the above described embodiments of this invention, the crystal piece 21 and the prisms 22A and 22B or 13′ have been assembled so as to put the electric field of the generated light parallel to the X or the Y axis of the crystal piece 21 to emphasize the intensity-modulation effect. This is not the sole angular relation between the X or the Y axis of the crystal and the plane of polarization (perpendicular to the electric field) of the generated light component. In particular, when the plane of polarization of the generated light component is rotated 45° from the X or the Y axis, namely, when the prisms 22A and 22B (so far as the embodiment of FIG. 1 is concerned, are kept in the respective positions shown in the drawing while the crystal piece 21 is rotated about the optical axis thereof by 45°) it is possible to effect frequency modulation of the generated light because the plane of polarization of the linearly polarized generated light component then will be parallel to the induced optical X′ or Y′ axis (which is produced by the modulating voltage that is applied in the direction of the optical axis) and the refractive index of the crystal piece 21 will vary with the modulating voltage to cause variation of the optical path for that linearly polarized light.

From the foregoing, it is now clear that an improved optical maser device has been disclosed herein which can separate the modulated light component from the light being reciprocated between the mirrors 12A and 12B more effectively than any known prior art device.

This improved optical maser device 10 includes a maser light source 11 and a pair of mirrors 12A and 12B positioned to intercept the light from said source 11 and to reciprocate the light from said source therebetween. In addition, the optical maser device 10 includes a modulating member 21 which is positioned in the reciprocating light path which in turn includes a crystal formed of a substance having a large electro-optical effect, such as calcite. Two end surfaces of said crystal are perpendicular to a given optical axis thereof, and modulating means 14 is connected to said crystal to supply a voltage which modulates light passing through said crystal 21. In addition, a birefringence prism 13 is positioned between said source 11 and said modulating member 21. Said prism transmits light from said source 11 to said modulating member 21 in a manner usual for a prism. On the other hand, prism 13 separates the modulated light reflected back thereto through the modulating member from one of said reflectors 12B from the remaining light which continues to be reciprocated.

While I have described above the principles of my invention in connection with specific embodiments, it is to be clearly understood that this description is made only by way of example and not as a limitation to the scope of my invention as set forth in the objects thereof and in the accompanying claims.

What is claimed is:

1. In an internal modulation type optical maser device of the type including a laser light source, a pair of reflectors to reciprocate therebetween light from source, a modulating member positioned between one of said reflectors and said light source and having a crystal piece formed of a substance which exhibits a large electro-optical effect and which is provided with two end surfaces perpendicular to a given optical axis thereof, and a birefringence prism of triangular cross section positioned in the reciprocating light path between said light source and said modulating means for extracting only the modulated light component from the light being reciprocated, the improvement wherein the birefringence prism is formed of a material whose refractive index for extraordinary rays is approximately equal to the refractive index of said crystal for ordinary rays, said birefringence prism being attached directly to one of said end surfaces of said crystal piece with the optical axis of said prism substantially parallel to the plane of the electric field of the light from said source, said light being incident with the angle of incidence substantially equal to the Brewster angle onto the surface of said prism, not in contact with said crystal piece and travelling along said optical axis of said crystal piece.

2. An optical maser device as set forth in claim 1 wherein the second reflector is attached to the other of said two end surfaces of said crystal.

3. An optical maser device as set forth in claim 2 wherein the second reflector is a reflective film coated over the other of said two end surfaces of said crystal.

4. An internal modulation type optical maser device as claimed in claim 1 characterized in that a prism of homogeneous material is attached to the other of said end surfaces of said crystal piece in such a manner that the Brewster non-reflection condition is satisfied as to the reciprocating light.

5. An internal modulation type optical maser device as claimed in claim 1 characterized in that the birefringence prism is formed of calcite.

References Cited

UNITED STATES PATENTS 3,243,724  3/1966  Vuylsteke ---------- 331—94.5
3,277,393  10/1966  Nicolai ------------ 331—94.5

OTHER REFERENCES

D'Haenens et al.: Lasers and Their Applications, J. of the SMPTE, vol. 71 (November 1962), pp. 828–832 and in particular FIG. 3.

Targ et al.: Laser Frequency Translation by Means of Electro-Optic Coupling Control, Proc of the IEEE, vol. 52, No.10 (October 1964), pp. 1247 and 1248.

RONALD L. WIBERT, Primary Examiner

W. L. SIKES, Assistant Examiner

U.S. Cl. X.R.

350—160